United States Patent
Ohashi et al.

(10) Patent No.: US 11,966,642 B2
(45) Date of Patent: Apr. 23, 2024

(54) INFORMATION PROCESSING DEVICE, INSTALLATION METHOD, AND PROGRAM

(71) Applicant: SEIKO EPSON CORPORATION, Tokyo (JP)

(72) Inventors: Kazuki Ohashi, Shiojiri (JP); Yohei Kondo, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/936,909

(22) Filed: Sep. 30, 2022

(65) Prior Publication Data

US 2023/0105493 A1  Apr. 6, 2023

(30) Foreign Application Priority Data

Oct. 4, 2021 (JP) ................................. 2021-163362

(51) Int. Cl.
*G06F 3/12* (2006.01)

(52) U.S. Cl.
CPC ............ *G06F 3/1225* (2013.01); *G06F 3/126* (2013.01)

(58) Field of Classification Search
CPC ................................ G06F 3/1225; G06F 3/126
See application file for complete search history.

(56) References Cited

U.S. PATENT DOCUMENTS

| | | | | |
|---|---|---|---|---|
| 2012/0026551 | A1* | 2/2012 | Tarumi | G06F 3/1285 358/1.15 |
| 2012/0200877 | A1* | 8/2012 | Kanamori | G06F 3/1206 358/1.13 |
| 2012/0212760 | A1* | 8/2012 | Sakura | G06F 3/1204 358/1.13 |
| 2021/0026573 | A1* | 1/2021 | Yamaguchi | G06F 3/126 |
| 2021/0096794 | A1* | 4/2021 | Chew | G06F 3/126 |
| 2021/0240412 | A1* | 8/2021 | Saigusa | G06F 3/1288 |

FOREIGN PATENT DOCUMENTS

JP  2019-008673 A  1/2019

OTHER PUBLICATIONS

Microsoft Build, Identifier Score—Windows drivers _ Microsoft Doc, May 2022.

* cited by examiner

*Primary Examiner* — John R Wallace
(74) *Attorney, Agent, or Firm* — WORKMAN NYDEGGER

(57) ABSTRACT

An information processing device changes a printer queue generated at the time of USB coupling with a printer to a printer queue corresponding to a predetermined printer driver, when it is detected that the generated printer queue is not a printer queue corresponding to the predetermined printer driver.

11 Claims, 3 Drawing Sheets

INFORMATION PROCESSING DEVICE, INSTALLATION METHOD, AND PROGRAM

The present application is based on, and claims priority from JP Application Serial Number 2021-163362, filed Oct. 4, 2021, the disclosure of which is hereby incorporated by reference herein in its entirety.

BACKGROUND

1. Technical Field

The present disclosure relates to an information processing device, an installation method, and a program.

2. Related Art

According to the related art, a method of executing plug and play at the time of USB coupling, thus installing a printer driver, and generating a printer queue, is known.

For example, JP-A-2019-8673 discloses an information processing device having a measure for installing a printer driver and a measure for registering custom setting information as default setting information when the installed printer driver is a custom printer driver.

When there are a plurality of drivers corresponding to the printer coupled to the information processing device, it is desirable that the printer corresponds to a proper driver of these drivers. However, the printer may correspond to a different driver.

SUMMARY

An aspect of the present disclosure is directed to an information processing device including: an acquisition unit acquiring a printer driver for controlling a printer; a first processing unit installing the printer driver acquired by the acquisition unit, in the information processing device; and a second processing unit generating a printer queue storing print data to be processed by the printer, when USB coupling with the printer is detected. The first processing unit changes the generated printer queue to a printer queue corresponding to the installed printer driver, when it is detected that the printer queue generated by the second processing unit is not a printer queue corresponding to the installed printer driver.

Another aspect of the present disclosure is directed to an installation method for installing a printer driver in an information processing device. The installation method includes: acquiring a printer driver for controlling a printer; installing the acquired printer driver in the information processing device; generating a printer queue storing print data to be processed by the printer, when USB coupling with the printer is detected; and changing the generated printer queue to a printer queue corresponding to the installed printer driver, when it is detected that the generated printer queue is not a printer queue corresponding to the installed printer driver.

Still another aspect of the present disclosure is directed to a non-transitory computer-readable storage medium storing a program. The program causes a computer loaded in an information processing device to execute: acquiring a printer driver for controlling a printer; installing the acquired printer driver in the information processing device; generating a printer queue storing print data to be processed by the printer, when USB coupling with the printer is detected; and changing the generated printer queue to a printer queue corresponding to the installed printer driver, when it is detected that the generated printer queue is not a printer queue corresponding to the installed printer driver.

Still another aspect of the present disclosure is directed to a non-transitory computer-readable storage medium storing a program. The program causes an information processing device establishing a correspondence between a terminal driver for controlling a terminal and the terminal when USB coupling with the terminal is detected, to execute: determining whether a more appropriate terminal driver than the terminal driver corresponding to the terminal exists from among a plurality of already installed terminal drivers or not; and establishing a correspondence between the more appropriate terminal driver and the terminal in response to a determination that the more appropriate terminal driver exists.

DESCRIPTION OF EXEMPLARY EMBODIMENTS

Figure 1:
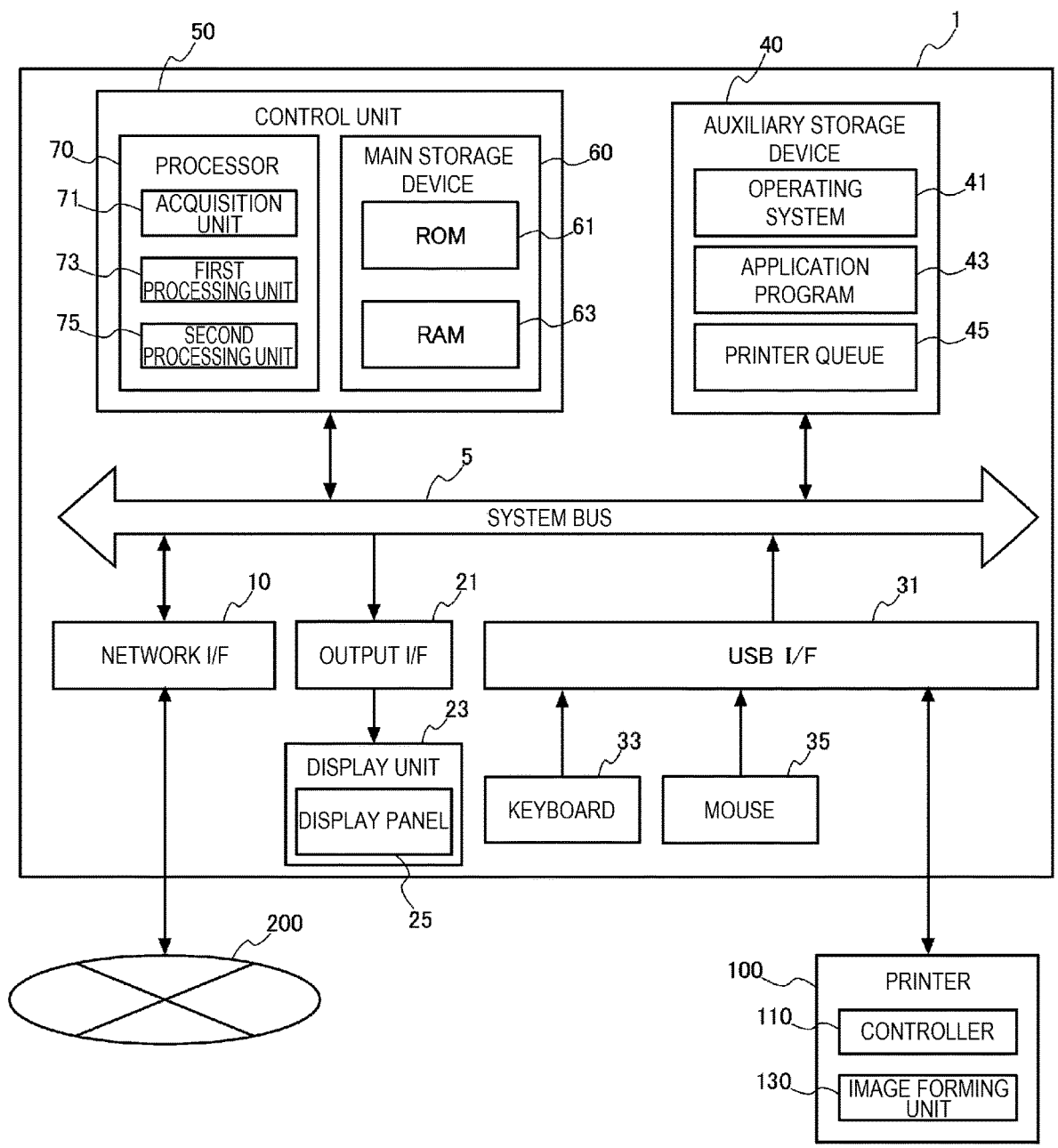
FIG. 1 is a block diagram showing the configuration of an information processing device and a printer.

FIG. 1 is a block diagram showing the configuration of an information processing device 1 and a printer 100.

The information processing device 1 has a network interface 10, an output interface 21, a display unit 23, a USB interface 31, a keyboard 33, a mouse 35, an auxiliary storage device 40, and a control unit 50. Hereinafter, the interface is abbreviated as I/F.

The network I/F 10, the output I/F 21, the USB I/F 31, the auxiliary storage device 40, and the control unit 50 are coupled to a system bus 5.

The network I/F 10 is an interface for network communication that communicates data to and from an external device via a network such as a LAN (local area network).

The display unit 23 is coupled to the output I/F 21. The output I/F 21 has a coupling terminal and outputs drawing data inputted from the control unit 50, to the display unit 23. The coupling terminal, for example, conforms to a standard such as DVI (Digital Visual Interface), HDMI (High-Definition Multimedia Interface), or Display Port. HDMI is a registered trademark.

The display unit 23 has a display panel 25. As the display panel 25, for example, a liquid crystal panel or an organic EL (electroluminescence) panel is used. The display unit 23 causes the display panel 25 to display an image based on the drawing data inputted from the control unit 50 via the output I/F 21.

The keyboard 33 and the mouse 35 are coupled to the USB I/F 31. Also, the printer 100, and a reading device, not illustrated, can be coupled to the USB I/F 31. The reading device reads data recorded in a portable recording medium and outputs the read data to the control unit 50. The recording medium includes an optical disc, a magneto-optical disc, a semiconductor memory or the like.

The USB I/F 31 has a coupling terminal conforming to the USB standard and communicates data to and from the keyboard 33, the mouse 35, and the printer 100 coupled to this coupling terminal.

The keyboard 33 and the mouse 35 are input devices accepting a user's operation.

The printer 100 has a controller 110 and an image forming unit 130 and is USB-coupled to the information processing device 1.

The controller 110 is a control device controlling the printer 100.

The image forming unit 130 is controlled by the controller 110 and prints an image based on print data inputted from the controller 110, on a recording paper.

The auxiliary storage device 40 is, for example, a non-volatile storage device such as an HDD (hard disk drive) or an SSD (solid-state drive).

The auxiliary storage device 40 stores an operating system 41 and an application program 43. The operating system 41 and the application program 43 are control programs executed by a processor 70. The operating system 41 is hereinafter referred to as the OS 41.

The control unit 50 has a main storage device 60 and the processor 70. The control unit 50 has the processor 70 execute control programs stored in the main storage device 60 and the auxiliary storage device 40 and thus comprehensively controls each part of the information processing device 1.

The main storage device 60 has a ROM (read-only memory) 61 and a RAM (random-access memory) 63.

The ROM 61 stores a control program such as a BIOS (Basic Input/Output System) for starting the information processing device 1.

The RAM 63 stores data and a program used for arithmetic operations by the processor 70 executing the control program.

The processor 70 is an arithmetic processing device formed by a CPU (central processing unit) or an MPU (micro-processing unit). The processor 70 may be formed by a single processor or a plurality of processors. The processor 70 may also be formed by an SoC (system-on-a-chip) integrated with a part or the entirety of the main storage device 60 or with another circuit. The processor 70 may also be formed by a combination of a CPU executing a program and a DSP (digital signal processor) executing predetermined arithmetic processing. Also, all the functions of the processor 70 may be installed in hardware or may be configured using a programmable device.

The control unit 50 has an acquisition unit 71, a first processing unit 73, and a second processing unit 75, as functional blocks. The functional blocks represent, in the form of blocks, the functions implemented by the processor 70 executing the control program.

The acquisition unit 71 acquires a printer driver for controlling the printer. For example, the acquisition unit 71 causes the reading device coupled to the USB I/F 31 to read information recorded on a CD-ROM and thus acquires an installation package recorded on the CD-ROM.

The acquisition unit 71 also connects to a server device of a printer vendor via the network I/F 10 and downloads an installation package from the connected server device.

The installation package includes an installation program and a printer driver. The installation program is hereinafter referred to as an installer. The installation package is a package provided by the printer vendor providing the printer 100. The printer 100 is a printer coupled to the information processing device 1 and thus used by the user of the information processing device 1.

The first processing unit 73 is a function implemented by the processor 70 executing the installer. The installer is a computer program for installing the printer driver in the information processing device 1 and thus configuring the information processing device 1 to be able to start the printer driver. The installer is provided as a file in an executable file format. When executed, the installer copies a file of the printer driver and a setting file or the like into the auxiliary storage device 40 of the information processing device 1.

The printer driver is a program for executing control to receive image data from the application program 43, convert the image data into print data in a format that can be interpreted by the printer 100, and output the converted print data to the printer 100. When converting the image data received from the application program 43 into the print data, the printer driver performs, for example, resolution conversion processing, color conversion processing, halftone processing, rasterization processing, command attachment processing, and the like.

The second processing unit 75 is a function implemented by the processor 70 executing the OS 41. When having detected that the printer 100 is coupled to the USB I/F 31, the second processing unit 75 generates a printer queue in the auxiliary storage device 40 by plug and play.

The second processing unit 75 generates a printer queue, which is a folder, and registers the generated printer queue in a registry of the auxiliary storage device 40. The second processing unit 75 stores the model name, port ID, print setting and the like of the printer 100 in the printer queue registered in the registry. The registry is a database storing information about settings used in the OS 41.

The second processing unit 75 also determines a printer driver with which the generated printer queue is associated, according to the priority ranking of the printer driver that is preset in the OS 41. In the OS 41, a driver rank, which is an identifier indicating the priority ranking of the printer driver, is set. The driver rank is information representing the priority ranking of the printer driver with which the printer queue is associated. The printer driver included in the driver rank includes a printer driver with a matching hardware ID, a printer driver with a matching compatible ID, and an IPP class driver. Hereinafter, the hardware ID is abbreviated as HID and the compatible ID is abbreviated as CID.

The HID is identification information that is defined by the printer vendor and set for each model of the printer 100.

The CID, too, is identification information that is defined by the printer vendor and set to be common to the models of compatible printers. The CID is also referred to as compatible ID. An example of the printer driver with a matching CID is a universal printer driver. That is, installing a driver with a CID corresponding to the model of a compatible printer enables the printer to operate.

The IPP class driver is a driver provided in the OS 41.

In the related art, the driver ranks are set in such a way that the printer driver of the printer with a matching HID has the highest priority ranking and that the printer driver of the printer with a matching CID and the IPP class driver have the next priority rankings in this order.

It is now assumed that the setting of the driver ranks is changed due to a change in the specifications of the OS 41 in such a way that the priority ranking of the IPP class driver becomes higher than the priority ranking of the printer driver of the printer with a matching CID. It is also assumed that the driver acquired by the acquisition unit 71 is the printer driver with a matching CID and that this printer driver with a matching CID is installed in the information processing device 1. In this case, the second processing unit 75 executing the OS 41 associates the generated printer queue with the IPP class driver with the higher priority ranking. That is, the second processing unit 75 associates the generated printer queue with the IPP class driver even though a copy of the printer driver with a matching CID is generated in the auxiliary storage device 40.

Also, it is now assumed that the setting of the driver ranks is changed due to a change in the specifications of the OS 41 in such a way that the priority ranking of the IPP class driver becomes higher than the priority ranking of the printer driver of the printer with a matching HID. It is also assumed that the driver acquired by the acquisition unit 71 is the printer driver with a matching HID and that this printer driver with a matching HID is installed in the information processing device 1. In this case, the second processing unit 75 executing the OS 41 associates the generated printer queue with the IPP class driver with the higher priority ranking.

The first processing unit 73 generates a copy of the printer driver in the auxiliary storage device 40 and then detects a printer queue generated by the OS 41. The first processing unit 73 executes the detection of a printer queue after generating a copy of the printer driver in the auxiliary storage device 40 and before the USB coupling of the printer 100 is detected. The first processing unit 73 executes the detection of a printer queue, using an API (application programming interface) provided by the OS 41. For example, when the OS 41 is Windows, EnumPrinters of Windows API is used for the detection. Windows is a registered trademark. The first processing unit 73 acquires a list of printer queues from the OS 41. This list of printer queues is referred to as a list before queue generation.

As the second processing unit 75 executes plug and play and thus generates a printer queue in the auxiliary storage device 40, the first processing unit 73 re-detects a printer queue generated by the OS 41. The first processing unit 73 executes the re-detection of a printer queue, after the USB coupling of the printer 100 is detected and the second processing unit 75 executes plug and play. In this case, too, the first processing unit 73 executes the detection of a printer queue, using the API provided by the OS 41. The first processing unit 73 acquires a list of printer queues from the OS 41. The list of printer queues acquired at this point is referred to as a list after queue generation.

After acquiring the list before queue generation and the list after queue generation, the first processing unit 73 compares the list before queue generation with the list after queue generation and detects the printer queue generated by plug and play.

After detecting the printer queue generated by plug and play, the first processing unit 73 acquires information about the printer driver with which the detected printer queue is associated. For example, the first processing unit 73 acquires the information about the printer driver with which the printer queue is associated, based on the model name of the printer 100 stored in the printer queue. For example, the first processing unit 73 acquires the information about the printer driver with which the printer queue is associated, using the API provided by the OS 41. For example, when the OS 41 is Windows, the first processing unit 73 acquires the information about the printer driver with which the printer queue is associated, using GetPrinter of Windows API.

The first processing unit 73 determines whether the printer queue generated by the OS 41 is associated with the printer driver whose copy is generated in the auxiliary storage device 40 or not, based on the information about the printer driver with which the acquired printer queue is associated. When having determined that the printer queue generated by the OS 41 is not associated with the printer driver, the first processing unit 73 associates the generated printer queue with the printer driver installed by the first processing unit 73.

Figure 2:
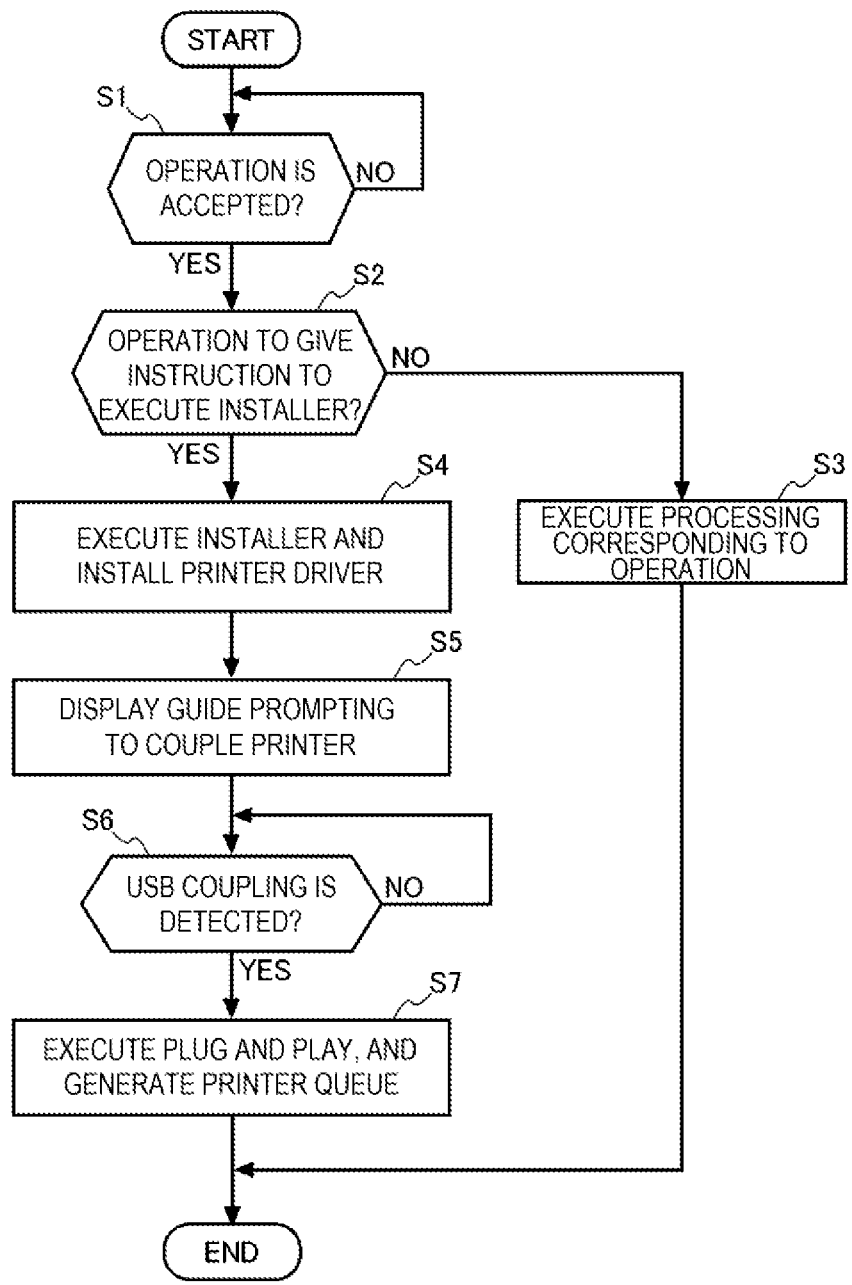
FIG. 2 is a flowchart showing a related-art operation of the information processing device.

FIG. 2 is a flowchart showing the related-art operation of the information processing device 1.

First, the related-art operation of the information processing device 1 will now be described with reference to the flowchart shown in FIG. 2.

The control unit 50 determines whether a user's operation is accepted via the keyboard 33 or the mouse 35 or not (step S1). When a user's operation is not accepted via the keyboard 33 or the mouse 35 (NO in step S1), the control unit 50 waits until an operation is accepted.

When a user's operation is accepted via the keyboard 33 or the mouse 35 (YES in step S1), the control unit 50 determines whether the accepted operation is an operation to give an instruction to execute the installer included in the installation package or not (step S2).

When the accepted operation is not an operation to give an instruction to execute the installer (NO in step S2), the control unit 50 executes processing corresponding to the operation accepted in step S1 (step S3) and ends this processing flow.

When the accepted operation is an operation to give an instruction to execute the installer (YES in step S2), the control unit 50 executes the installer. Thus, a copy of the printer driver included in the installation package is generated in the auxiliary storage device 40 of the information processing device 1 and the printer driver is installed in the information processing device 1 (step S4).

Next, the control unit 50 causes the display unit 23 to display a guide prompting the user to USB-couple the printer 100 (step S5).

Next, the control unit 50 determines whether the USB coupling of the printer 100 is detected by plug and play or not (step S6). When the USB coupling of the printer 100 is not detected (NO in step S6), the control unit 50 waits until the coupling of the printer 100 is detected.

When the USB coupling of the printer 100 is detected (YES in step S6), the control unit 50 executes plug and play and generates a printer queue in the registry in the auxiliary storage device 40 (step S7) and ends this processing flow.

Figure 3:
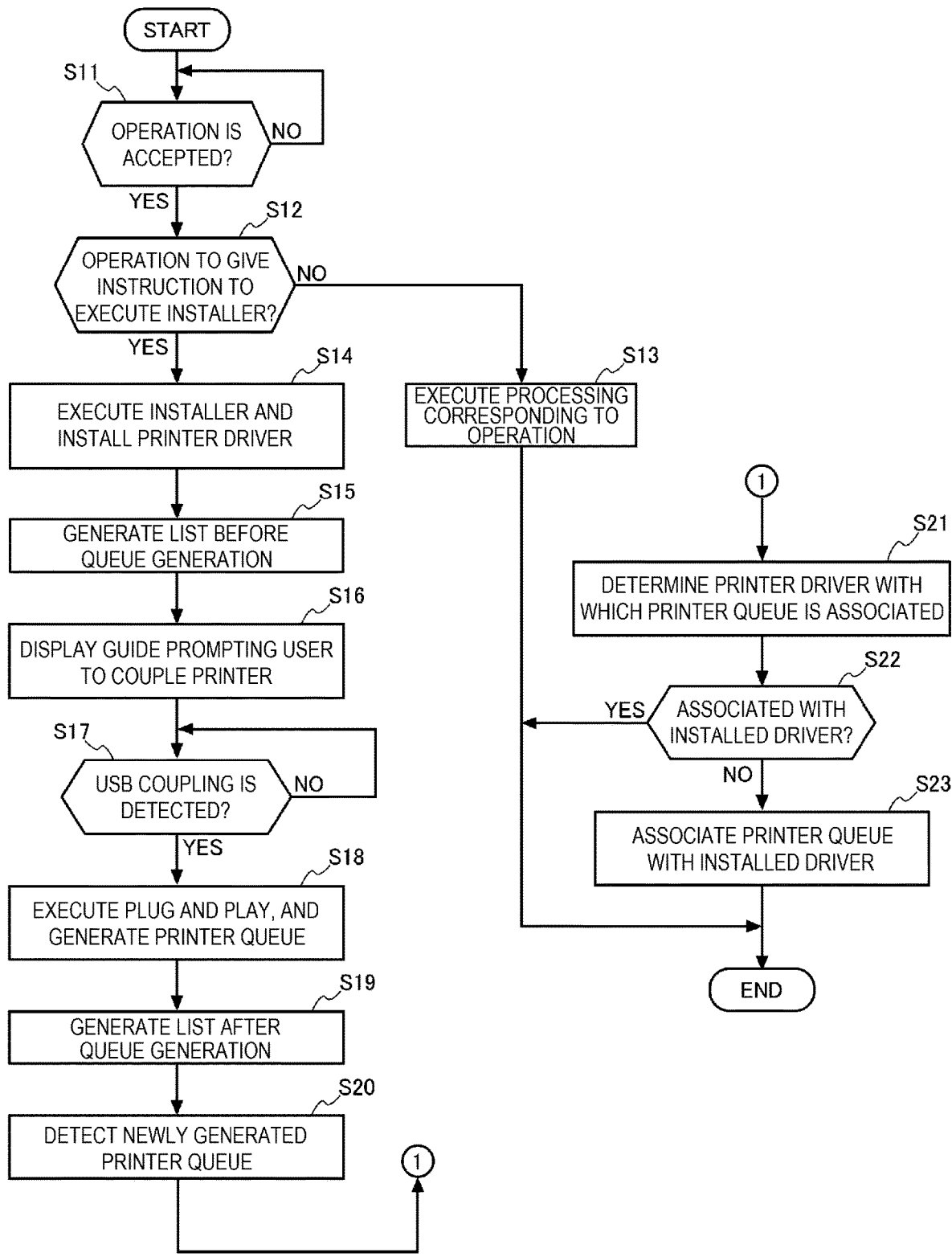
FIG. 3 is a flowchart showing an operation of the information processing device.

FIG. 3 is a flowchart showing an operation of the information processing device 1 according to this embodiment.

First, the operation of the information processing device 1 according to this embodiment will now be described with reference to the flowchart shown in FIG. 3.

The operation of the information processing device 1 in steps S11 to S14 shown in FIG. 3 is the same as the related-art operation of the information processing device 1 shown in FIG. 2 and therefore will not be described further.

When the printer driver is installed in the information processing device 1 (step S14), the control unit 50 detects a list of printer queues already generated in the information processing device 1. The control unit 50 generates a list of printer queues already generated in the information processing device 1, as a list before queue generation, using the API provided by the OS 41 (step S15).

Next, the control unit 50 causes the display unit 23 to display a guide prompting the user to USB-couple the printer 100 (step S16).

Next, the control unit 50 determines whether the USB coupling of the printer 100 is detected by plug and play or not (step S17). When the USB coupling of the printer 100 is not detected (NO in step S17), the control unit 50 waits until the USB coupling of the printer 100 is detected.

When the USB coupling of the printer 100 is detected (YES in step S17), the control unit 50 executes plug and play and generates a printer queue in the registry in the auxiliary storage device 40 (step S18).

Next, the control unit 50 detects a list of printer queues already generated in the information processing device 1. The control unit 50 generates a list of printer queues already generated in the information processing device 1, as a list after queue generation, again using the API provided by the OS 41 (step S19).

Next, the control unit 50 compares the list before queue generation with the list after queue generation and detects a printer queue generated after the execution of plug and play (step S20).

Next, the control unit 50 determines the printer driver with which the detected printer queue is associated (step S21). The control unit 50 determines whether the determined printer driver with which the printer queue is associated is the printer driver installed by the installed executed in step S14 or not (step S22).

When the printer driver with which the printer queue is associated is not the printer driver installed in step S14 (NO in step S22), the control unit 50 executes the following processing. The control unit 50 associates the printer queue detected in step S20 with the printer driver installed in step S14 (step S23) and ends this processing flow.

Meanwhile, when the printer driver with which the printer queue is associated is the printer driver installed in step S14 (YES in step S22), the control unit 50 ends this processing flow.

As described above, the information processing device 1 according to this embodiment has the acquisition unit 71, the first processing unit 73, and the second processing unit 75.

The acquisition unit 71 acquires a printer driver for controlling the printer 100.

The first processing unit 73 installs the printer driver acquired by the acquisition unit 71, in the information processing device 1.

As the printer driver is installed in the information processing device 1, the second processing unit 75 generates a printer queue storing print data to be processed by the printer 100.

When it is detected that the printer queue generated by the second processing unit 75 at the time of USB-coupling with the printer 100 is not a printer queue corresponding to the installed printer driver, the first processing unit 73 changes the generated printer queue to a printer queue corresponding to the installed printer driver.

Thus, even when the printer queue generated by the second processing unit 75 does not correspond to the installed printer driver, the first processing unit 73 changes the generated printer queue to a printer queue corresponding to the installed printer driver.

Therefore, the installed printer driver can output print data to the corresponding printer 100 and can cause the printer 100 to execute printing.

The printer queue generated by the second processing unit 75 is a printer queue for the IPP class driver generated by the first processing unit 73 executing the OS 41.

The printer driver acquired by the acquisition unit 71 is a universal printer driver and is a printer driver having an HID that does not match the printer and a CID matching the printer.

When the printer driver that is a universal driver printer and has a CID matching the printer is installed in the information processing device 1, a printer queue corresponding to the IPP class driver may be generated in some cases. This occurs when the IPP class driver has a higher priority ranking than the universal printer driver and the printer driver having a CID matching the printer, based on the priority rankings of the printer drivers. Even when a printer queue corresponding to the IPP class driver is generated, the generated printer queue can be changed to a printer queue corresponding to the printer driver having a CID matching the printer, and the printer driver having a CID matching the printer can cause the printer to execute printing.

The second processing unit 75 decides a printer driver to correspond to a printer queue to be generated, based on the priority rankings of the printer drivers in the OS 41.

Therefore, a printer driver to correspond to a printer queue is decided according to the priority rankings of the printer driver in the OS 41.

The printer drivers with the priority rankings prescribed in the OS 41 include a printer driver with a matching HID, an IPP class driver, and a printer driver with a matching CID.

Therefore, no matter which one of the printer driver with a matching HID, the IPP class driver, and the printer driver with a matching CID is installed in the information processing device 1, a printer queue corresponding to the installed printer driver can be generated.

As the installation of the printer driver in the information processing device 1 ends, the first processing unit 73 causes the OS 41 to detect, a plurality of times, information about a printer queue generated in the information processing device 1, and thus detects the printer queue generated by the second processing unit 75, based on the information about the printer queue detected the plurality of times.

Therefore, the printer queue generated by the second processing unit 75 can be accurately detected.

The first processing unit 73 causes the OS 41 executing an application programming interface listing printers that are available for use, to detect, a plurality of times, information about the printer queue generated in the information processing device 1.

Therefore, the application programming interface can detect the information about the printer queue.

The first processing unit 73 causes the OS 41 to detect, a plurality of times, information about a printer queue generated in the information processing device 1 before the printer 100 is USB-coupled and after the printer 100 is USB-coupled, and thus detects the printer queue generated by the second processing unit 75.

Therefore, the printer queue generated by the second processing unit 75 can be accurately detected.

The foregoing embodiment represents one aspect and any modifications and applications can be made thereto.

For example, each component shown in FIG. 1 is an example and not particularly limited. A piece of hardware corresponding individually to each component need not necessarily be installed. A single processor may be configured to execute a program to implement functions of each component. A part of the functions implemented by software may be implemented by hardware. Alternatively, a part of the functions implemented by hardware may be implemented by software. Moreover, the specific detailed configuration of each of the other parts of each device in the information processing device 1 can be arbitrarily changed. For example, the first processing unit 73 in the foregoing embodiment may be divided into a processing unit that installs a printer driver in the information processing device 1 and a processing unit that changes a printer queue generated by the second processing unit to a printer queue corresponding to the installed printer driver when it is detected that the generated printer queue is not a printer queue corresponding to the installed printer driver. In this way, one component in the embodiment may be divided into a plurality of components. Also, processing described as a series of processes in the embodiment may be divided into a plurality of processes, which may be started separately. For example, the processing of step S14, the processing of steps S17 and S18, and the processing of steps S22 and S23 can be executed separately as separate programs.

In the case of implementing the installation method or the program by using the computer provided in the information processing device 1, the program to be executed by the computer can be configured in the form of a recording medium. As the recording medium, a magnetic or optical recording medium or a semiconductor memory device can be used. A portable recording medium such as a flexible disk, an HDD (hard disk drive), a CD-ROM, a DVD, a Blu-ray disc, a magneto-optical disc, a flash memory or a card-type recording medium, or a fixed recording medium may be employed. The recording medium may also be a non-volatile storage device such as a RAM, a ROM or an HDD that is an internal storage device provided in a server device. Blu-ray is a registered trademark.

The processing steps of the operations shown in the flowcharts of FIGS. 2 and 3 are provided by dividing the processing according to the main content of the processing in order to facilitate the understanding of the operation of each device in the information processing device 1. The way the processing is divided into processing steps and the names of the processing steps do not limit the present disclosure. The processing may be divided into more processing steps according to the content of the processing. The processing may be divided in such a way that one processing step includes more processing. The order of the processing steps may be changed where appropriate.

The present disclosure can also be applied to a case where various terminals such as a scanner and a projector, other than a printer, are USB-coupled. When a queue is not used, it may be determined whether a more appropriate terminal driver than the terminal driver corresponding to the terminal exists from among a plurality of already installed terminal drivers or not, and the correspondence may be changed in such a way that the more appropriate terminal driver and the terminal correspond to each other in response to the determination that the more appropriate terminal driver exists.

What is claimed is:

1. An information processing device comprising:
a processor; and
a non-transitory memory storing control programs that, when executed by the processor, cause the information processing device to:
acquire a printer driver for controlling a printer;
install the acquired printer driver in the information processing device;
generate a printer queue storing print data to be processed by the printer, when USB coupling with the printer is detected; and
change the printer queue, which does not correspond to the installed printer driver, to a printer queue corresponding to the installed printer driver, when it is detected that the printer queue is not the printer queue corresponding to the installed printer driver, wherein
the control programs, when executed by the processor, cause the information processing device to cause an operating system to detect, a plurality of times, information about a printer queue generated in the information processing device, when the printer driver is installed in the information processing device, and
detect the generated printer queue based on the information about the printer queue detected the plurality of times.

2. The information processing device according to claim 1, wherein
the control programs, when executed by the processor, cause the information processing device to execute an operating system and thus generate a printer queue for an IPP class driver.

3. The information processing device according to claim 1, wherein
the acquired printer driver is a universal printer driver.

4. The information processing device according to claim 1, wherein
the acquired printer driver is a driver having a compatible ID matching a compatible ID set for the printer.

5. The information processing device according to claim 1, wherein
the control programs, when executed by the processor, cause the information processing device to decide a printer driver to correspond to a printer queue to be generated, based on a priority ranking of a printer driver set in an operating system.

6. The information processing device according to claim 5, wherein
a plurality of printer drivers having the priority ranking set in the operating system includes a first driver with a matching hardware ID and an IPP class driver, and a second driver with a matching compatible ID.

7. The information processing device according to claim 1, wherein the control programs, when executed by the processor, cause the information processing device to cause the operating system executing an application programming interface listing printers that are available for use, to detect, a plurality of times, the information about the printer queue generated in the information processing device.

8. The information processing device according to claim 1, wherein
the control programs, when executed by the processor, cause the information processing device to cause the operating system to detect the information about the printer queue generated in the information processing device before the printer is USB-coupled and after the printer is USB-coupled, and
detect the generated printer queue based on the printer queue detected before the printer is USB-coupled and the printer queue detected after the printer is USB-coupled.

9. The information processing device according to claim 1, wherein
the control programs, when executed by the processor, cause the information processing device to change the generated printer queue to a printer queue corresponding to a printer driver with a matching compatible ID, when it is detected that the generated printer queue is a printer queue for an IPP class driver.

10. A non-transitory computer-readable storage medium storing a control program, the program causing an information processing device to execute:
acquiring a printer driver for controlling a printer;
installing the acquired printer driver in the information processing device;
generating a printer queue storing print data to be processed by the printer, when USB coupling with the printer is detected; and changing the printer queue, which does not correspond to the installed printer driver, to a printer queue corresponding to the installed printer driver, when it is detected that the printer queue is not the printer queue corresponding to the installed printer driver, wherein the control program, when executed by a processor, causes the information processing device to cause an operating system to detect, a plurality of times, information about a printer queue generated in the information processing device, when the printer driver is installed in the information processing device, and detect the generated printer queue based on the information about the printer queue detected the plurality of times.

11. A non-transitory computer-readable storage medium storing a program, the program causing an information processing device establishing a correspondence between a terminal and a terminal driver for controlling the terminal to execute:
  when USB coupling with the terminal is detected:
  generating a printer queue after executing plug and play;
  generating a first list of printer queues in the information processing device before generating the printer queue and a second list of printer queues in the information processing device after generating the printer queue;
  detecting the generated printer queue by comparing the first list with the second list;
  determining whether a printer driver associated with the generated printer queue is the terminal driver; and
  associating the terminal driver with the generated printer queue in response to a determination that the printer driver associated with the generated printer queue is not the terminal driver.

* * * * *